May 15, 1928.  H. G. KUCK  1,669,875
DISPLAY COVER FOR CONTAINERS
Filed Sept. 18, 1924   2 Sheets-Sheet 1
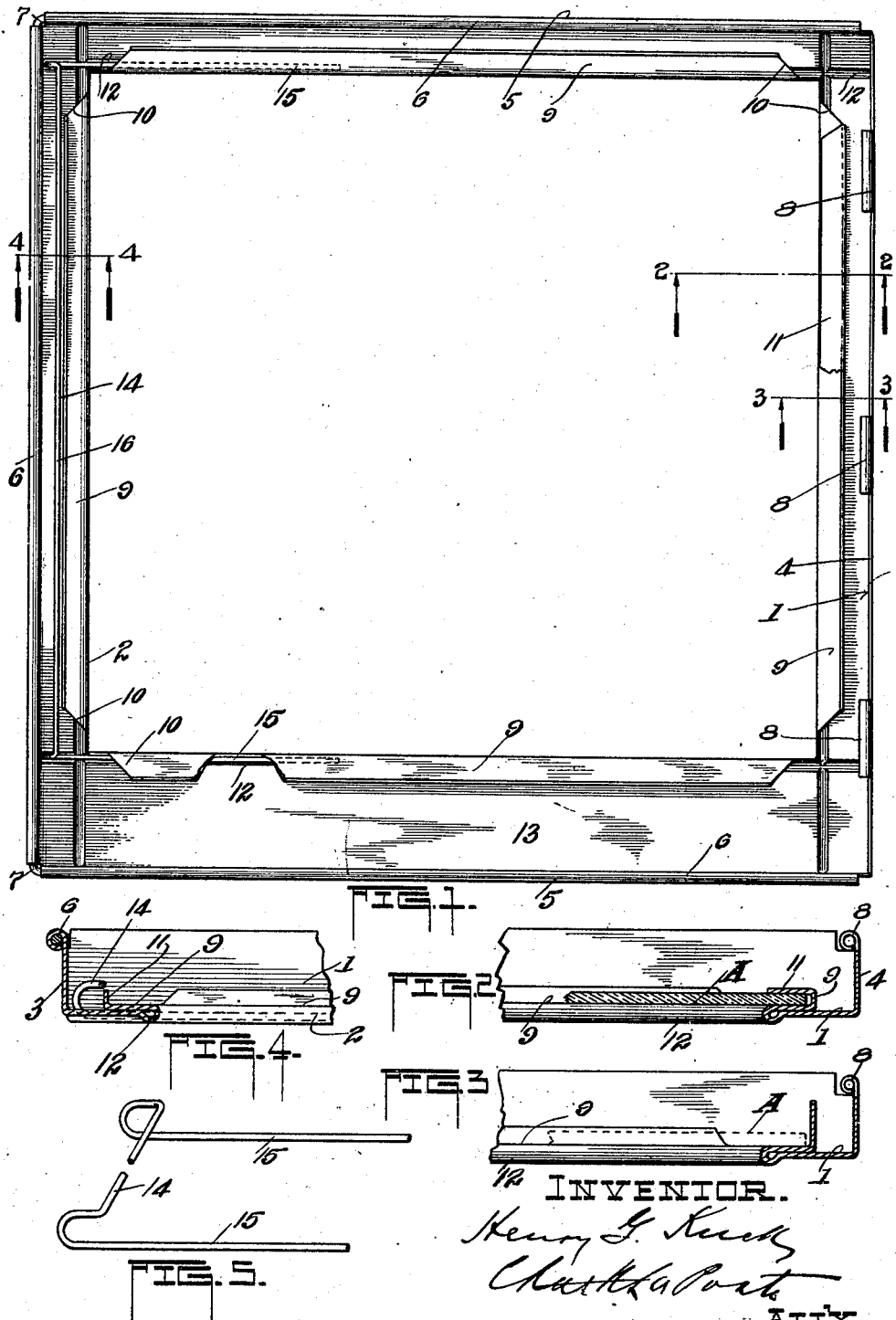

May 15, 1928.
H. G. KUCK
DISPLAY COVER FOR CONTAINERS
Filed Sept. 18, 1924
1,669,875
2 Sheets-Sheet 2
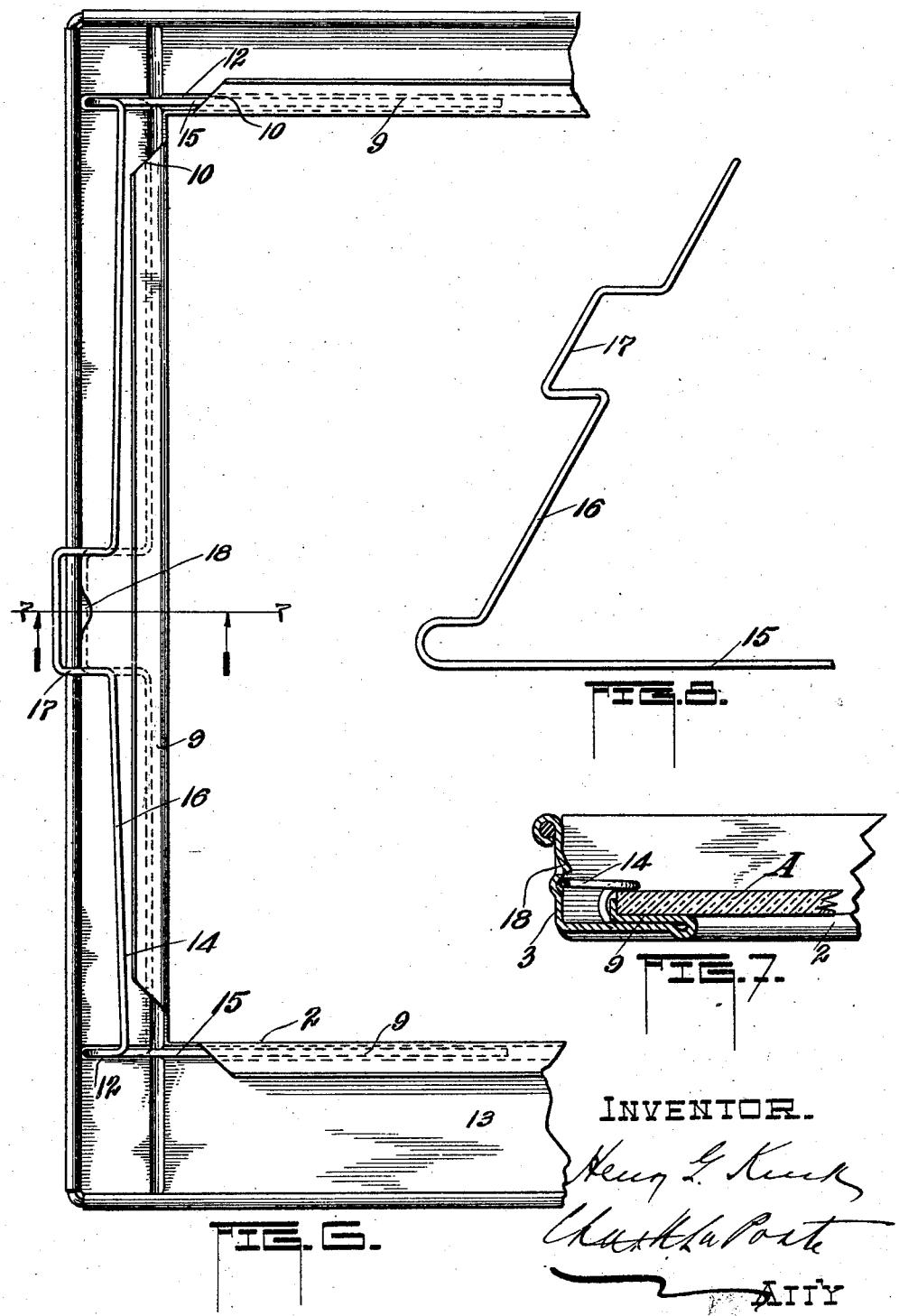

Patented May 15, 1928.

1,669,875

UNITED STATES PATENT OFFICE.

HENRY G. KUCK, OF PEORIA, ILLINOIS, ASSIGNOR TO STUBER & KUCK CO., OF PEORIA, ILLINOIS, A CORPORATION OF ILLINOIS.

DISPLAY COVER FOR CONTAINERS.

Application filed September 18, 1924. Serial No. 738,381.

This invention has reference to display-covers for containers and like receptacles in which are packed cakes, crackers and similar pastry and bakery goods.

The invention has for its principal object to provide a novel construction for holding the glass or other transparent sheet in the cover, and to so construct the cover and display opening therein as to require the least amount of glass or other transparent sheet to cover said opening.

The invention has for a further object the construction of a display cover wherein the edge walls of the opening are turned inwardly and backwardly to provide rests and guides for the glass or other transparent sheet and the face of said cover surrounding said opening embossed outwardly to enhance the beauty of said display cover, certain of said embossings providing grooves on the inner face of said cover in which holding means for said glass or other transparent sheet may have a sliding relation.

A further object of the invention is a glass rest on the inside face of the cover, comprising inwardly and rearwardly turned back flanges one of which is adapted to be bent over one edge of the glass, and a wire clip slidable in relation to certain of said flanges and having a portion to overlie one edge of the glass.

That the invention may be more fully understood reference is had to the accompanying drawings forming a part of the description, illustrating a preferred embodiment of the invention, in which:—

Figure 1 is an inside face view of a display cover embodying my invention, the glass being omitted;

Figure 2 is a cross-section as the same would appear on the line 2—2 Figure 1, the glass being shown in place;

Figure 3 is a cross-section as the same would appear on the line 3—3 Figure 1, the dotted lines indicating the glass and the bending over flange being unbent;

Figure 4 is a cross-section as the same would appear on the line 4—4, Figure 1, the glass being omitted;

Figure 5 is a perspective view of the glass holding wire clip, partially broken away;

Figure 6 is a partial inside face view of the cover and a modified glass holding wire clip;

Figure 7 is a cross-section as the same would appear on the line 7—7 Figure 6, the glass in place, and Figure 8 is a perspective view of the glass holding wire clip shown in Figure 6, partially broken away.

Like characters of reference denote corresponding parts throughout the figures.

The uses for display covers of the character herein shown and described are well known and need not be enumerated here, and it is also well known to those skilled in this art that such covers are usually hingedly associated with frames, not shown, arranged for attachment to the open ends of containers made of metal or other suitable material.

The cover includes the face plate 1 having an opening 2 for the display of wares therethrough, and provided with the front and rear side walls 3 and 4 and opposite end walls 5. The inner edges of the walls 3 and 5 are formed with tubular beads 6 in which is enclosed a stiffening rod 7, and the inner edge of the rear wall 4 is formed with a series of spaced short tubular beads 8 to provide hinge members for the cover adapted to have a hinge relation with complementary portions on the frame, not shown, in manner similar to structures now in use.

When stamping or punching the cover, the walls of the display opening 2 are left with flanges 9 the ends of which are beveled, as at 10, and these flanges are bent inwardly and backwardly to lie flat on the rear face of the face plate of the cover, as shown and their inner edges turned, as at 11, to provide guiding flanges for a glass or other transparent sheet, designated A. The flange 9 in proximity to the rear wall 4 of the cover is cut much deeper than the remaining flanges 9 so that when it is bent to provide a guiding flange 11, see Figures 2 and 3, said guiding flange is of such a depth that it may be bent over the edge of the glass A, whereas the other guiding flanges 11 are mere abutments for the glass A when laid on the flanges 9 to overlie or cover the display opening 2.

The face of the cover, adjacent the edges of the display opening 2 and surrounding the same is embossed outwardly, as at 12, such embossings, when the flanges 9 are bent inwardly and backwardly forming grooves extending cross-wise of the cover beneath said flanges, the embossings crossing each other at the corners of the display opening 2 and extending to the opposite edges of the cover in each direction and thereby enhancing the facial design of the face plate of said cover. These embossings together with the rolled edges of the cover provide panels which surround the display opening 2, the lower panel 13 being of greater width than the upper panel so as to provide space for a name plate or word embossing to designate the name of the dispenser of the wares or the name of the ware within the container.

The construction of the cover with the glass rests and guides surrounding the immediate edges of the display opening 2 therein, reduces the cost considerably in glass and lessons considerably the weight of the cover. Heretofore it has been customary, so far as applicant is aware, to provide a glass of substantially the size and shape of the inside of the cover.

To secure a glass A in the inside of the cover, such glass is laid on the flanges 9 bearing against the guiding flanges 11 and such guiding flange 11 in proximity to the rear wall 4 is bent over on to the glass, as shown in Figure 2. To hold the glass against lateral displacement, a wire clip 14 is made to overlie the edges of the glass in proximity to the outer wall 3 of the cover. This clip 14 is substantially U shape and is preferably bent into form from a single piece of wire, the ends 15 being slidable in the grooves 12 at the top and bottom edges of the display opening 2 beneath the flanges 9. The cross connection 16 of said clip adapted to be moved to overlie the edge of the glass A to retain the same, or be moved into a detached position to enable the lifting of the glass and withdrawal of the edge thereof from under the overlying guiding flange 11. Thus it is provided to remove and replace a glass for cleaning or other purposes or to substitute a new sheet of glass.

In Figure 1 the clip is in a detached or non-holding position and in Figure 6 the clip is shown in both a holding and non-holding position, the former position being shown in dotted lines. Also in Figure 6 the cross connection 16 of the clip is shown formed with an offset 17 adapted to normally engage with a stop 18 formed in the front wall 3 to prevent accidental displacement of the clip and loosening of the glass. To detach the clip to allow for the removal of the glass the offset 17 is gripped and sprung from beneath the stop 18 and moved into the full line position shown in Figure 6.

It is obvious from the foregoing that various changes may be made without departing from the spirit and scope of the invention, and I therefore do not wish to be limited to the exact disclosure, except as may be defined by the appended claims.

What I claim is:—

1. A display cover for containers having a display opening and inwardly and backwardly turned flanges extending longitudinally along the edges of said opening providing rests for a transparent member, each of said flanges having an abutting and guiding flange one of which is of a width to be turned over an edge of the transparent member, and a separate holder for another edge of the transparent member the same having a sliding relation with certain of said flanges.

2. A display cover for containers having a display opening and inwardly and backwardly turned flanges extending longitudinally along the edges of said opening providing rests for a transparent member, the edges of the cover surrounding said opening being embossed outwardly to provide grooves on the inside face of said cover beneath said flanges, each of said flanges having an abutting and guiding flange one of which is of a width to be turned over an edge of the transparent member, and a wire holder having a portion to overlie another edge of the transparent member and end portions slidable in certain of said grooves.

3. A display cover for containers having a display opening and inwardly and backwardly turned flanges extending longitudinally along the edges of said opening providing rests for a transparent member, the edges of the cover surrounding said opening being embossed outwardly to provide grooves on the inside face of said cover beneath said flanges, each of said flanges having an abutting and guiding flange one of which is of a width to be turned over an edge of the transparent member, and a wire holder having a portion to overlie another edge of the transparent member and formed with an off-set providing a stop and a finger-hold and having right-angle end portions slidable in certain of said grooves.

4. A display cover for containers having a display opening, side walls on three sides of the cover and hinge members on the remaining side, the edge walls of said opening constituting flanges bent inwardly and backwardly for approximately the length of said edge walls providing rests for a transparent member and having abutting and guiding flanges along their respective edges, the face of said cover surrounding said opening having embossed ribs forming interiorly arranged grooves, the spacing of the lower rib from the lower edge of the cover providing a name panel on the face of said cover, and holding means slidable in certain of said grooves.

In witness whereof, I have hereunto affixed my hand and seal this 15th day of September, 1924.

HENRY G. KUCK.